United States Patent Office 3,277,075
Patented Oct. 4, 1966

3,277,075
DYESTUFFS CONTAINING HYDROXYETHYL-
SULFONYLMETHYL GROUPS
Raymond L. Mayhew, Summit, N.J., Saul R. Buc, deceased, late of Easton, Pa., by Dolores M. Buc, administratrix, Easton, Pa., Harlan B. Freyermuth, Easton, Pa., and David I. Randall, New Vernon, N.J., assignors to General Aniline & Film Corporation, New York, N.Y., a corporation of Delaware
No Drawing. Filed Oct. 21, 1963, Ser. No. 317,802
8 Claims. (Cl. 260—201)

This application is a continuation-in-part of application Serial No. 863,126, filed December 31, 1959, now abandoned.

This invention relates to novel dyestuffs and more particularly to dyestuffs capable of dyeing textile fibers in any desired shades of improved fastness properties and the like.

It is an object of this invention to provide a class of novel dyestuffs capable of dyeing textile fibers and the like. Another object of this invention is the provision of such a class of dyestuffs which may be employed in dyeing textile fibers to produce dyeings having improved properties such as fastness, and/or brightness and the like. A further object of this invention is to provide water-soluble dyestuff molecules containing nuclearly bound sulfonic acid groups which are conveniently suitable for use of the dyer and which do not precipitate prematurely during dyestuff padding operation. A still further object of this invention is the provision of such a class of dyestuffs which may be readily manufactured without undue degradation of the dyestuff and other undesired effects. Yet another object of this invention is the provision of such a class of dyestuffs which will not be subject to the disadvantages attributable to prior art dyestuffs. Other objects and advantages will appear as the description proceeds.

The attainment of the above objects is made possible by the present invention which includes the provision of dyestuffs having the formula

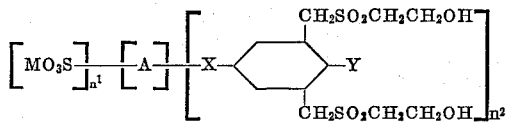

wherein A represents a dyestuff molecule; X represents a mono-, di-, or triatomic bridging link; Y is selected from the group consisting of H, lower alkyl and lower alkoxy; M is a member of the group consisting of H and alkali metal, alkaline earth metal, ammonium and amine cations; $n^1$ has an average value of 0 to 3; and $n^2$ has an average value of 1 to 4.

It has been found that dyestuffs of the above formula are readily and economically manufactured, relatively speaking, and are readily applied from solution to textile fibers and the like by dyeing, padding and printing for the production of improved dyeings. It will be noted that the hydroxyethylsulfonylmethyl groups in these dyestuffs are substituted in pendant aryl nuclei (right-hand bracketed portion of the formula) whereby such dyestuffs contain a greater number of such groups. This is because the pendant aryl nuclei in the present dyestuffs are generally much more susceptible of multiple substitution with hydroxyethylsulfonylmethyl groups than are the nuclei in the dyestuff molecule per se. It is accordingly possible to produce dyestuffs of the present invention having 2 or more hydroxyethylsulfonylmethyl groups substituted in the same aryl nucleus and/or more such groups substituted in the dyestuff molecule than is possible with the prior art dyestuffs. Further, the dyestuffs of this invention may be prepared without subjecting them to the possibly deleterious effects of an oxidation step as required in converting the hydroxyethylmercaptomethyl-containing intermediate to the corresponding sulfone.

In the subject dyestuffs the presence of a non-removable nuclearly substituted solubilizing group ($SO_3M$) has been found decidedly advantageous in avoiding premature precipitation during the dyeing process. While earlier practice would lead one to believe that retaining a non-removable water-soluble grouping in the dyestuff moiety would impair wash fastness, it has unexpectedly been found that in the case of the subject dyestuffs this effect is outweighted by the improved bonding, reaction or attraction between the dye and the fiber.

In the above formula A represents any organic dyestuff molecule. Any known dyestuff molecule may be employed, such dyestuffs generally being of aromatic character in containing at least one carbocyclic or heterocyclic ring in which the pendant aryl nuclei and the sulfonic acid radicals may be substituted. Venkataraman's "Chemistry of Synthetic Dyes," Academic Press, N.Y., 1952, volumes I and II, discloses a multitude of synthetic dyestuffs which may be employed in producing the derivatives of this invention. Natural organic dyestuffs may of course also be employed, in the same manner.

As examples of dyestuffs which may be employed as component A in producing the products of this invention, there may be mentioned nitro dyes such as 2,4-dinitro-4'-hydroxydiphenylamine, monoazo, disazo and other polyazo dyes such as aminophenol→1-(2'-chloro-5'-sulfophenyl)-3-methyl-5-pyrazolone, o-anisyl→1-hydroxynaphthalene-5-sulfonic acid, naphthylamine→N-ethyl - N - (3'-sulfobenzyl)-aniline, 2-anisyl→2 - amino - 8 - naphthol, 4-amino - 2 - sulfodiphenylamine→1 - naphthylamine→2-naphthol-6-sulfonic acid, and the like, urea and cyanuric acid derivatives, thiazoles such as Primuline (CI 812), stilbenes such as Diamine Orange D (CI 621), azoic dyes such as o-chloroaniline→2-hydroxy-3-naphthanilide and o - aminoazotoluene→acetoacetanilide, diphenylmethanes such as Auramine O (CI 655), triphenylmethanes such as Pararosaniline, xanthenes such as Fluorescein, Rhodamine and Pyronine, acridines such as Acridine Orange NO (CI 788) and Benzoflavine (CI 791), azines, oxazines and thiazines such as Safranine, Induline, Methylene Blue, the Indulines of CI 859–863, Aniline Black and Gallocyanine (CI 883), benzophenones, benzoquinones and naphthoquinones such as Alizarine Yellow (CI 1014) and Alizarine Black SRA (CI 1022), anthraquinones such as 1-amino-4-hydroxyanthraquinone, 1,2-dihydroxyanthraquinone, 2,3 - dichloro-1,4 - diaminoanthraquinone monosulfonic acid, 4,4-diamino-1,1'-dianthrimide, 2,1-pyridinoanthraquinone, anthraquinone - imidazole, pyrimidanthrone, pyrazolanthrone, anthrapyridone, anthrapyrimidone, 2,3,7,8-dibenzopyrene - 1,6 - quinone, 1,4 - bisbenzamidoanthraquinone, anthraquinonyl benzothiazole carboxylic acid, thioxanthone, dibenzanthrone, pyranthrone, dianthraquinonylamine, and other substituted and fused anthraquinone derivatives, indigoids and thioindigoids and their derivatives, sulfur dyes, cyanine dyes such as xanthiapocyanine and pseudocyanine, and the like. Preferably, the A moiety is the residue of an azo, nitro, methine, di- or triphenylmethane, perylene carboxylic acid imides, oxazine, aminochloranil dyestuff. The invention is particularly advantageous when the A moiety is relatively insoluble in view of the solubilizing effects resulting from the substitution therein of the said pendant aryl nuclei and, desirably, the sulfonic acid radicals.

In the above formula, X preferably represents the diatomic bridging link —$SO_2NR$—, —$CH_2NR$— or —$CONR$—, or the monoatomic bridging link —$NR$—, wherein R is alkyl of 1 to 4 carbon atoms, e.g., methyl, to butyl or preferably H, as more fully described below.

However, the identity of X is not too critical, and may also represent other known equivalent mono-, di-, or triatomic bridging links suitable for connecting the pendant aryl nuclei in the present compounds to the fundamental aryl nuclei of the phthalocyanine molecule.

Illustratively, other suitable bridging links include —O—, —NRSO$_2$—, SO$_2$NRNH—, —CH$_2$—, —C$_2$H$_4$—, —CH$_2$SO$_2$—, —CH$_2$NR—, —CH$_2$S—, —CH$_2$O—, —CO—, —S—, —CONH—, and SCH$_2$—, the actual linkage atoms in such bridging links being generally C, S, O or N or any combination thereof. Methods for producing dyestuffs of the present type containing such bridging links are known and will otherwise become apparent to persons skilled in the art.

As shown in the above formula, Y may be H, lower alkyl such as methyl and ethyl, or lower alkoxy such as methoxy and ethoxy, M may represent H, sodium, potassium, lithium, calcium, barium, magnesium, ammonium, mono-, di-, and tri-ethanol-, -propanol-, -methyl-, ethyl-, and -propyl-amines, cyclohexylamine, morpholine, pyridine, picoline, and the like. It will be understood that the products of this invention will comprise mixtures of molecules containing different amounts of substituents attached to A in the above formula, and that $n^1$ and $n^2$ represent the average of such substituents therein.

In accordance with a preferred embodiment of this invention, the dyestuff A as above described, is reacted in known manner with chlorosulfonic acid to introduce from 1 to 4 nuclearly substituted sulfonyl chloride groups and 0 to 3 nuclearly substituted sulfonic acid groups. This sulfonyl chloride-containing derivative may then be reacted with an intermediate having the formula shown in the right-hand bracketed portion, X being amino, whereby the desired dyestuff is produced by reaction between the sulfonyl chloride groups of said derivative and the amino groups of the intermediate, with elimination of HCl. At least one molecule of the said intermediate and preferably the number of molecules of such intermediate equal to the number of sulfonyl chloride groups in said derivative ($n^2$) are employed in this reaction.

The sulfamidation reaction is, in instances wherein the said intermediate is not sufficiently soluble in aqueous media, preferably carried out in the presence of a water-miscible organic solvent for said intermediate. As examples of suitable mutual solvents, there may be mentioned methanol, ethanol, butanol, Cellosolves (lower alkyl and benzyl ethers of ethylene glycol), Carbitols (loweralkyl ethers of diethylene glycol), dioxane, acetone, methyl ethyl ketone, and the like. An organic or inorganic acid binding agent of known type is also preferably included in the reaction mixture. Pyridine and other organic bases have the added advantage of serving simultaneously as mutual solvent and acid-binding agent. The acid binding agent neutralizes the by-product HCl and prevents formation of the unreactive HCl salt of the amine intermediate.

The dyestuff precursor may be reacted in known manner with chlorosulfonic acid to produce the desired derivative containing at least one and up to four sulfonyl chloride groups. This reaction is generally carried out at elevated temperatures, generally above 100° C. and preferably in the presence of some phosphorus pentachloride. The chlorosulfonated intermediate is then isolated by drowning the reaction mixture in ice and filtering off the precipitated product. The product may contain an average of 0 to 3 sulfonic acid groups and 1 to 4 sulfonyl chloride groups, depending upon variations in reaction conditions, particularly the temperature and ratios of reactants in the chlorosulfonation process. Preferably, conditions are employed whereby the chlorosulfonated dyestuff contains at least one sulfonic acid group, thereby increasing the adaptability of the dyestuff for dyeing purposes in that precipitation of the dyestuff during dyeing is minimized or prevented. In any event, in the subsequent sulfamidation reaction, some of the sulfonyl chloride groups in the chlorosulfonated dyestuff will tend to be hydrolyzed in the aqueous medium employed to form nuclearly substituted sulfonic acid groups. Alternatively, the dyestuff if devoid of sulfonic acid groups, can be subsequently sulfonated prior to use for dyeing textile fibers and the like.

In accordance with another preferred embodiment the dyestuff as above described, containing at least one halogen (chlorine, bromine, etc.) substituent may be reacted with an intermediate having the formula shown in the right-hand bracketed portion, X being amino whereby the desired dyestuff is produced with elimination of hydrohalide. At least one molecule of the said intermediate and up to the number of molecules of such intermediate equal to the number of halogen atoms in said dyestuff ($n^2$) are employed in this reaction. This condensation is likewise preferably carried out in the presence of an acid binding agent as described above, organic or inorganic and, if desired, in the presence of a mutual organic solvent. If desired, the dyestuff may be first sulfonated or it may be sulfonated subsequent to the said condensation and prior to use in dyeing. In this instance, the bridging link X is monoatomic, namely —NH—.

In accordance with the above-described preferred embodiments, dyestuffs of the present invention may be prepared by reacting 5-amino-2-methyl-m-xylylene-$\alpha^1,\alpha^3$-bis-(2-sulfonylethanol), with the halogenated or chlorosulfonated dyestuff. No claim is herewith made to the novel 5-amino-2-methyl-m-xylylene - $\alpha^1,\alpha^3$ - bis(2-sulfonylethanol), which may be prepared by bischloromethylating 4-nitrotoluene in sulfuric acid or chlorosulfonic acid, condensing the resulting bischloromethylated derivative with mercaptoethanol, oxidizing the sulfide through the sulfoxide to the sulfone, and finally reducing the nitro derivative to the corresponding amine.

As stated above, other derivatives, intermediates and methods may be employed for introducing hydroxyethylsulfonylmethyl-substituted pendant aryl nuclei into the dyestuff molecule through the various types of bridging links. Illustratively, a dyestuff compound may be chloromethylated, and the chloromethyl-substituted dyestuff reacted with an aminobenzene compound containing 2 hydroxyethylsulfonylmethyl groups to produce the corresponding hydroxyethylsulfonylmethyl-containing dyestuffs in accordance with the present invention. In this instance, the bridging link X is the group —CH$_2$NH—.

As another illustration, the above mentioned 5-amino-2-methyl-m-xylylene-$\alpha^1,\alpha^3$-bis(2-sulfonylethanol) may be diazotized and reduced in known manner to produce the corresponding hydrazine, which hydrazine derivative may then be reacted with the chlorosulfonated dyestuff with elimination of HCl. In this instance, the bridging link X is triatomic, namely —SO$_2$NHNH—.

The dyestuffs of this invention have been found to be highly effective for dyeing and printing natural and synthetic fibers, particularly cellulosic fibers, in any desired shades of good to excellent fastness properties such as wash-fastness and the like. The dyeing or printing is preferably carried out by application of the dyestuff to the fibrous material followed by curing at a temperature above about 220° C., the maximum temperature being limited by the heat resistance of said material. The fibrous material may be in any of the usual forms, as for example in the form of staple fiber or continuous filaments in bulk form or in the form of tow, rope, yarns, slubbings, warps, fabrics, felts and the like, and treated as a wound package, running lengths, fibrous stock, bulk, etc. In addition to cellulose, these dyestuffs are also highly effective for dyeing and printing other fibers, including natural and synthetic polyamides such as wool, silk, casein, zein, nylon and polyurethane fibers.

The dyestuffs of this invention enable the production of dyeings having excellent fastness to wash, light, crocking and acid and alkaline perspiration.

The mechanism by which the dyestuffs of this invention yield dyeings of improved fastness properties and the like is apparently due to a reaction between the dyestuff and the fiber, e.g., an etherification reaction with the hydroxy groups in cellulose, an esterification reaction with carboxy groups in synthetic fibers containing recurring carboxylic groups in the polymer chain, etc. A further possibility of cross-linking exists which would yield further improvements in fastness properties, and the like.

The following examples are only illustrative of the present invention and are not to be regarded as limitative. All parts and properties referred to herein and in the appended claims are by weight unless otherwise indicated.

EXAMPLE 1

*Chlorosulfonation of dioxazine base from N-ethyl-3-aminocarbazole*

A 500 cc. 3-neck flask equipped with stirrer, thermometer and an air condenser and heated with a Glas-Col mantle is charged with 177 g. (100 ml.) chlorosulfonic acid and 10 g. phosphorus pentachloride (Baker) with stirring. After the phosphorus pentachloride is dissolved, 32 g. dioxazine from 2 moles N-ethyl-3-aminocarbazole and 1 mole chloranil (0.05 mole) are added portionwise during 15 minutes. During the addition, the temperature rises to 66° C. The temperature is slowly increased during 45 minutes to 120° C. and held at 120–125° C. for 3 hours. Hydrogen chloride is evolved during the reaction. The reaction mixture is cooled to room temperature and drowned into 1000 g. ice. The precipitated chlorosulfonated dioxazine is filtered and washed with ice water. 156 g. of wet cake is obtained.

*Sulfonamide formation*

35.2 g. (0.1 mole) of 5-amino-2-methyl-m-xylylene-$\alpha^1,\alpha^3$-bis-(2-sulfonylethanol) are dissolved in 600 cc. of a 1:1 pyridine:water solution by warming to 40–50° C. for a few minutes and cooling to room temperature. To this solution is added 78 g. of the chlorosulfonated dioxazine wet press cake and the mixture stirred overnight at room temperature. The mixture is then acidified by addition of 238 g. conc. HCl (sp. grav. 1.188) and simultaneously diluted with 1000 g. of a mixture of ice and water. The desired dyestuff precipitates and is filtered off, washed with 200 g. of 2% NaCl solution, and dried. The yield of dyestuff is 65 g. The dyestuff has the average formula

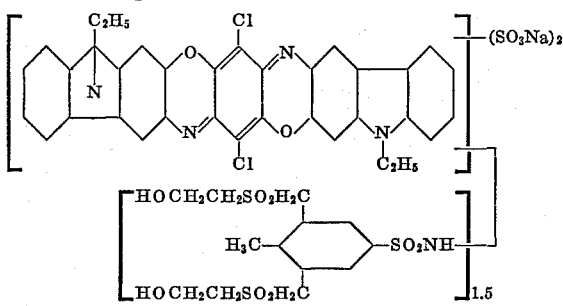

When 4 oz. of the above dyestuff, 12 oz. of urea and 3 oz. of sodium carbonate per gallon of pad liquor is employed for padding on cotton followed by heat curing at about 300° F., a reddish-blue dyeing is obtained having excellent wash fastness properties, as evidenced by little loss of shade upon soaping of the dyeing, in addition to other good fastness properties.

EXAMPLE 2

One mole of o-nitrobenzoyl chloride is reacted in anhydrous pyridine at room temperature with one mole of the intermediate employed in the sulfonamide formation of Example 1, namely 5-amino-2-methyl-m-xylylene-$\alpha^1,\alpha^3$-bis(2-sulfonylethanol), and the resulting compound is catalytically reduced with hydrogen in the presence of palladium and charcoal in ethanol. The resulting amino compound is isolated, diazotized and coupled in known manner at a pH of about 6 with 2-naphthol-3,6-disulfonic acid. The resulting reactive azo dyestuff dyes cotton in fast yellow shades when applied as described in Example 1. It has the formula of the Acid Alizarine Red B, CI 216 shown at the top of page 157 of Lubs, "Chemistry of Synthetic Dyes and Pigments," Reinhold Publishing Corporation (1955), except that the —COONa is replaced by the radical shown in the right hand bracketed portion of the formula first given herein above wherein X is CONH and Y is methyl.

EXAMPLE 3

One mole of o-nitrochlorobenzene is chlorosulfonated by boiling in chlorosulfonic acid and the resulting sulfochloride isolated by drowning in ice and water and then reacted in anhydrous pyridine at room temperature with one mole of the same intermediate as employed in Example 2. The resulting compound is then reacted with one mole of aniline in boiling aqueous alkaline medium. The resulting reactive nitro diphenylamine dyestuff colors cotton in fast yellow shades when applied as described in Example 1. It has the formula of dye No. VIII on page 256 of Lubs except that the —SO$_2$NH$_2$ group is replaced by the group in the right hand bracketed portion of the formula first shown above wherein X is SO$_2$NH and Y is methyl, and the nitrophenyl group is sulfonated.

EXAMPLE 4

One mole of perylene tetracarboxylic acid dianhydride is reacted in boiling o-phenylphenol with two moles of the intermediate employed in Example 2 and the resulting reactive perylene tetracarboxylic diimide dyestuff recovered by cooling, diluting with alcohol, and filtering off the crystallized dyestuff. It colors cotton in fast scarlet shades when applied as described in Example 1. The dyestuff has the formula shown on the upper right hand side of page 482 of Lubs except that both N-bonded hydrogen atoms are replaced by groups shown bonded to X in the right hand bracketed portion of the formula first given above wherein Y is methyl.

EXAMPLE 5

An alcoholic medium containing one mole of chloranil, two moles of the intermediate employed in Example 2, and two moles of sodium acetate, is refluxed for 15 minutes, cooled, and the resulting reactive aminochloranil dyestuff filtered off. It colors cotton in fast yellow shades when applied as described in Example 1. The dyestuff has the formula of dye No. IV on page 289 of Lubs except that each —NHAr group is replaced by the group shown in the right hand bracketed portion of the formula first given above wherein X is NH and Y is methyl.

EXAMPLE 6

One mole of p-chlorobenzaldehyde is reacted with chlorosulfonic acid at 100° C. and the resulting chlorosulfonated compound reacted with one mole of the intermediate employed in Example 2 in anhydrous pyridine at room temperature. The resulting compound is isolated by drowning in ice and water, and reacted with excess hydroxyethyl butyl amine in ethanol at 110° C., under autogenous conditions. To the foregoing reaction medium is then added one mole of cyanoethyl acetate and the mixture boiled until the reaction is complete, cooled, and the resulting reactive methine dyestuff filtered off. It colors cotton in fast greenish-yellow shades when applied as described in Example 1. The dyestuff has the formula of CI 48000 (CI Disperse Yellow 31) except that the chlorine atom is replaced by OH and the phenyl ring contains in meta position relative to the methine linkage the group shown in the right hand bracketed portion of the formula first given above wherein X is SO$_2$NH and Y is methyl and SO$_3$H in the other m-position.

EXAMPLE 7

One mole of 4-nitrophthalic anhydride is reacted in boiling phenol with one mole of the intermediate employed in Example 2, cooled, diluted with methanol and filtered. The resulting nitro compound is catalytically reduced to the corresponding amino dyestuff with hydrogen and palladium on charcoal in amyl alcohol. The resulting reactive naphthalimide dyestuff colors cotton in fast fluorescent greenish-yellow shades when applied as described in Example 1. It has the following formula

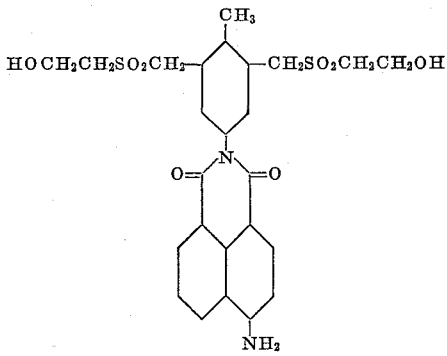

This invention has been disclosed with repect to certain preferred embodiments and various modifications and variations thereof will become obvious to persons skilled in the art. Thus, the procedures described in the above examples may be made use of in providing any known dyestuffs with fiber-reactive capabilities by insertion therein of one or more groups shown in the right hand bracketed portion of the formula first given above. Further, instead of the intermediate employed in said examples, there may be substituted, for example, 5-amino-2-methoxy-m-xylylene-$\alpha^1$-bis-(2-sulfonylethanol) (Y is methoxy), or 5-amino-m-xylylene-$\alpha^1,\alpha^3$-bis-(2-sulfonylethanol) (Y is H). Similarly, the dyestuffs of Examples 4, 5 and 7 may be further sulfonated for increased solubility. It is to be understood that such modifications and variations are to be included within the spirit and purview of this application and invention and the scope of the appended claims.

We claim:
1. A dyestuff of the formula

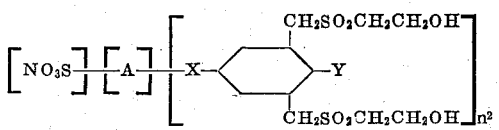

wherein A represents a dyestuff moiety selected from the group consisting of azo, nitro, methine, di- and tri-phenylmethane, perylene carboxylic acid imides, oxazine, and aminochloranil dyestuffs; X is a bridge link nuclearly substituted in dyestuff moiety A and selected from the group consisting of $SO_2NR$, $CH_2NR$, $CONR$, and $NR$; R is selected from the group consisting of H and 1 to 4 carbon atoms alkyl; Y is selected from the group consisting of H, lower alkyl and lower alkoxy; M is a member of the group consisting of H and alkali metal, alkaline earth metal, ammonium, and amine cations; $n^1$ has a value of 0 to 3; and $n^2$ has a value of 1 to 4

2. A dyestuff as defined in claim 1 wherein A is a dioxazine dyestuff moiety; X is $SO_2NH$; and Y is $CH_3$.

3. A dyestuff as defined in claim 1 wherein A represents an azo dyestuff moiety; X is $CONH$; and Y is $CH_3$.

4. A dyestuff as defined in claim 1 wherein A represents a nitrodiphenylamine dyestuff moiety; X is $SO_2NH$; and Y is $CH_3$.

5. A dyestuff as defined in claim 1 wherein A represents a perylene tetracarboxylic diimide dyestuff moiety; X is NR; and Y is $CH_3$.

6. A dyestuff as defined in claim 1 wherein A represents an aminochloranil dyestuff moiety; X is NH; and Y is $CH_3$.

7. A dyestuff as defined in claim 1 wherein A represents a methine dyestuff moiety; X is $SO_2NH$; and Y is $CH_3$.

8. A dyestuff as defined in claim 1 wherein A represents a naphthalimide dyestuff moiety; X is NR; and Y is $CH_3$.

No references cited.

CHARLES B. PARKER, *Primary Examiner.*

FLOYD D. HIGEL, *Assistant Examiner.*

UNITED STATES PATENT OFFICE
CERTIFICATE OF CORRECTION

Patent No. 3,277,075                                   October 4, 1966

Raymond L. Mayhew et al.

It is hereby certified that error appears in the above numbered patent requiring correction and that the said Letters Patent should read as corrected below.

Column 8, lines 5 to 9, for that portion of the formula reading

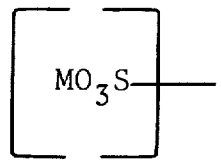      read      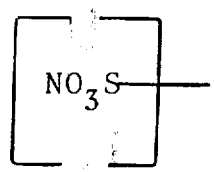

Signed and sealed this 22nd day of August 1967.

(SEAL)
Attest:

ERNEST W. SWIDER                               EDWARD J. BRENNER
Attesting Officer                              Commissioner of Patents